Patented Nov. 28, 1922.

1,436,747

UNITED STATES PATENT OFFICE.

ROKUSABURO YAMAMOTO, OF OSAKA, JAPAN.

MAGNESIA PLASTER HAVING POWDERED PEANUT SHELLS AS A CONSTITUENT.

No Drawing.  Application filed September 18, 1920.  Serial No. 411,076.

*To all whom it may concern:*

Be it known that ROKUSABURO YAMAMOTO, subject of the Emperor of Japan, residing at No. 558, Kizu, Imamiya-machi, Nishinari-gun, Osaka-prefecture, Japan, has invented certain new and useful Improvements in Magnesia Plaster having Powdered Peanut Shells as a Constituent, of which the following is a specification.

This invention relates to improvements in magnesia plaster having powder of peanut shell as one of its constituents, and is characterized by the facts that powder of pea-nut shell is used instead of powder of leather waste or of cork hitherto used, and that lead acetate is added thereto for the purpose of utilizing the oil contained in pea-nut shells as a drier or siccative without adding any other oils. The object of the invention is to produce a good drier from powdered pea-nut shells by causing manganese oxide and lead oxide to act upon oil contained in pea-nut shell, the manganese oxide usually existing in magnesia or magnesium oxide obtained by roasting magnesite and the lead oxide being obtained by chemical action of lead acetate added to magnesium oxide. Thus by such drier, the hygroscopic property, that is one of the defects of magnesia plaster, is greatly decreased. At the same time, magnesium acetate produced by chemical action of lead acetate upon magnesium oxide serves as an antiseptic as well as deodorizer upon the wood constituent used for composing the plaster.

Known magnesium plaster is made by mixing proper quantities of two or more of saw dust, wood powder, granular cork, cork-powder, leather waste or asbestos with magnesia or magnesium oxide and kneading the mixture with the addition of concentrated solution of magnesium chloride, or to which, when containing resins or oily substances as binding substances, is added lead acetate, magnesium chloride etc., for rendering the plaster water proof. But such known plaster is objectionable owing to its poor water-proof property. The chief object of the invention is to improve this hygroscopic property of the plaster, as well as to utilize a very cheap plentiful and equally elastic raw material as a substitute for cork powder or leather waste. At the same time, it is proposed to utilize the oil contained in pea-nut shell in the proportion of approximately 6 per cent as a good drier. For this purpose, a proper quantity of lead acetate is added which acts upon magnesium oxide and produces magnesium acetate and magnesium oxide. The latter acts upon the pea-nut oil, together with manganese oxide which is usually found in magnesia, and thus there is produced a good drier. Therefore magnesia plaster produced according to this invention is of low moisture absorptive quality and is devoid of a film of surface moisture even in rainy season. Moreover, magnesium acetate serves well as an antiseptic as well as a deodorizer upon the wood constituent in the composition utilizing saw dust, wood powder and powder of pea-nut shell and like materials.

*Example.*

I. Lower coating; the mixture of—

Saw dust _____ 5%.
Asbestos _____ 10%.
Magnesia _____ 40%.

is kneaded together with concentrated solution of Baumé 20°, viz. 44% solution of magnesium chloride dissolved in dilute or 2 or 3% solution of lead acetate.

II. For the upper coating, the mixture of—

Magnesia _____ 40%.
Powder of pea-nut shell ____ 5%.
Asbestos _____ 10%.
Pigment _____ 5%.

is kneaded together with concentrated or 44% solution of magnesium chloride dissolved in dilute or 2 or 3% solution of lead acetate. The upper coating is visible, so it must be kept in perfectly dried state and its hygroscopic property is greatly objectionable. Therefore, for this coating powdered pea-nut shells are used. The use of lead acetate in the lower coating is for the purpose of increasing the durability of the wood material used.

It will of course be understood that, without departing from the scope of the invention, the kinds of raw materials and their percentages may be modified according to the nature of the use to which the plaster is to be put, whether wall or floor, for instance and their positions, so that the proper hardness will be given to the plaster, so far as the characteristic point of using powder of pea-nut shell is maintained.

What I claim is:

Magnesia plaster consisting of a composition of fibrous materials 10%, magnesium oxide 40% and pigment 5% with the addition of powdered pea-nut shells 5% kneaded with concentrated solution of magnesium chloride 44% Baumé dissolved in dilute solution of lead acetate of approximately 2%, substantially as set forth.

In testimony whereof he affixes his signature in the presence of two witnesses.

ROKUSABURO YAMAMOTO.

Witnesses:
 H. J. NEWTON,
 SUED MORINE.